March 24, 1953 H. S. SHOEMAKER 2,632,371
CULTIVATOR
Filed July 5, 1947 4 Sheets-Sheet 1
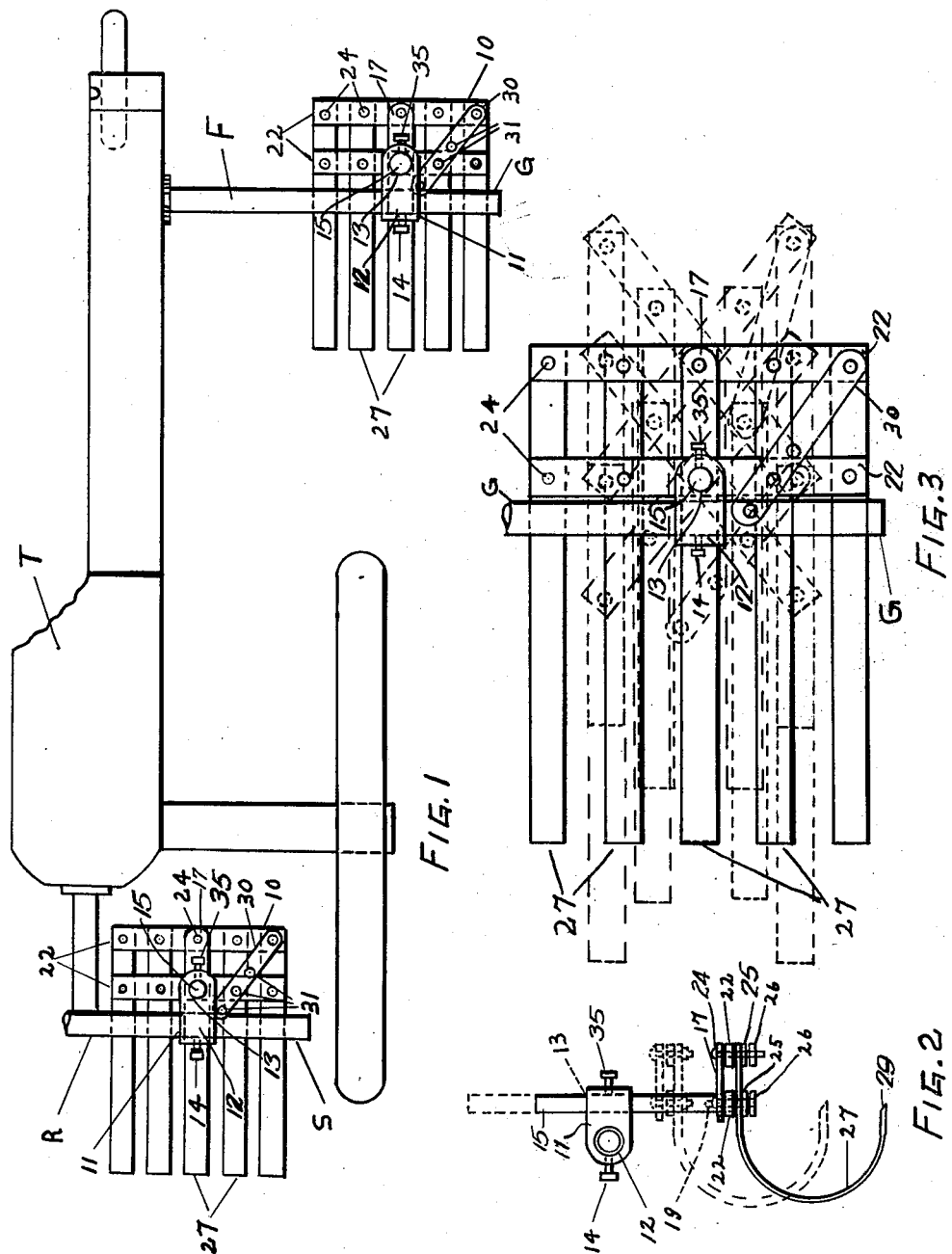
INVENTOR.
Henry S. Shoemaker
BY
A. F. Flournoy

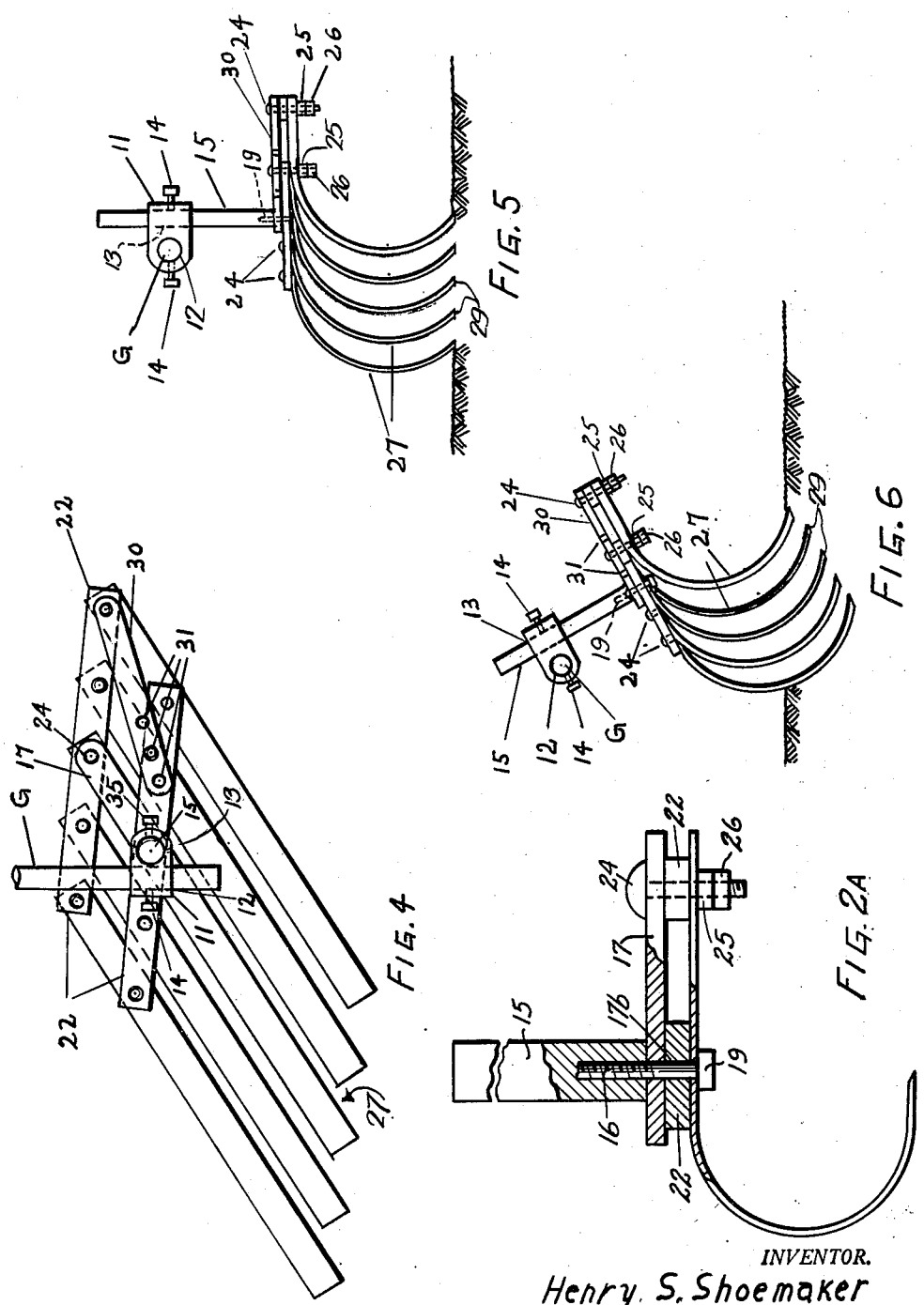

March 24, 1953     H. S. SHOEMAKER     2,632,371
CULTIVATOR
Filed July 5, 1947     4 Sheets-Sheet 3
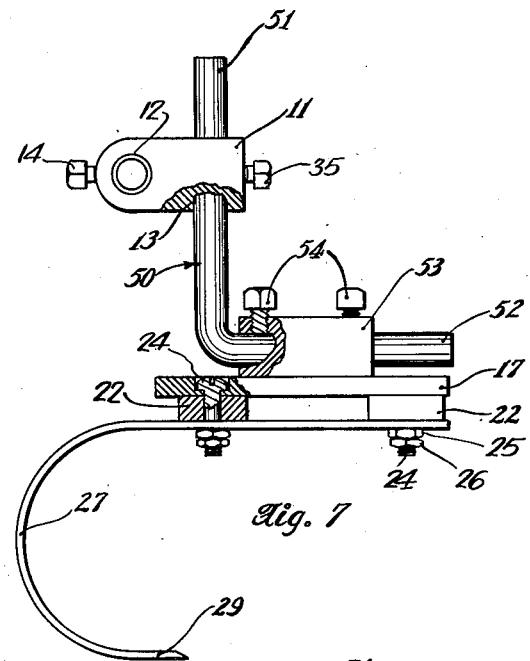
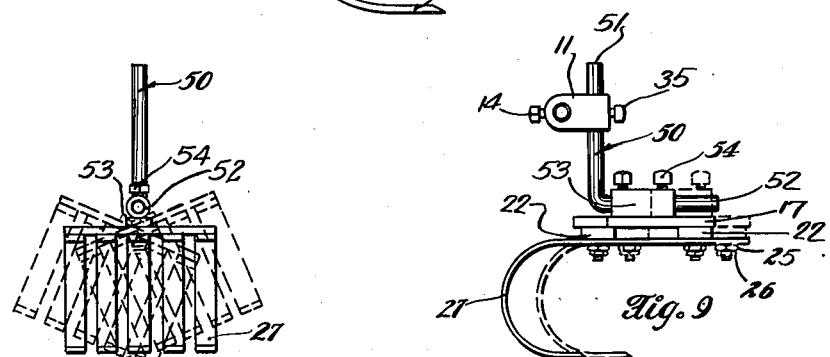
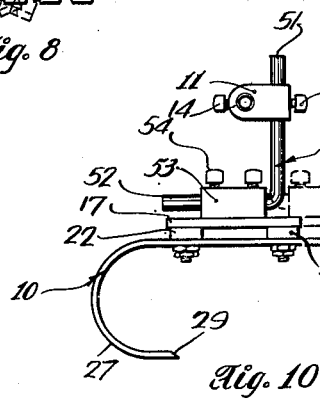
Inventor
Henry S. Shoemaker
A. F. Flournoy Attorney

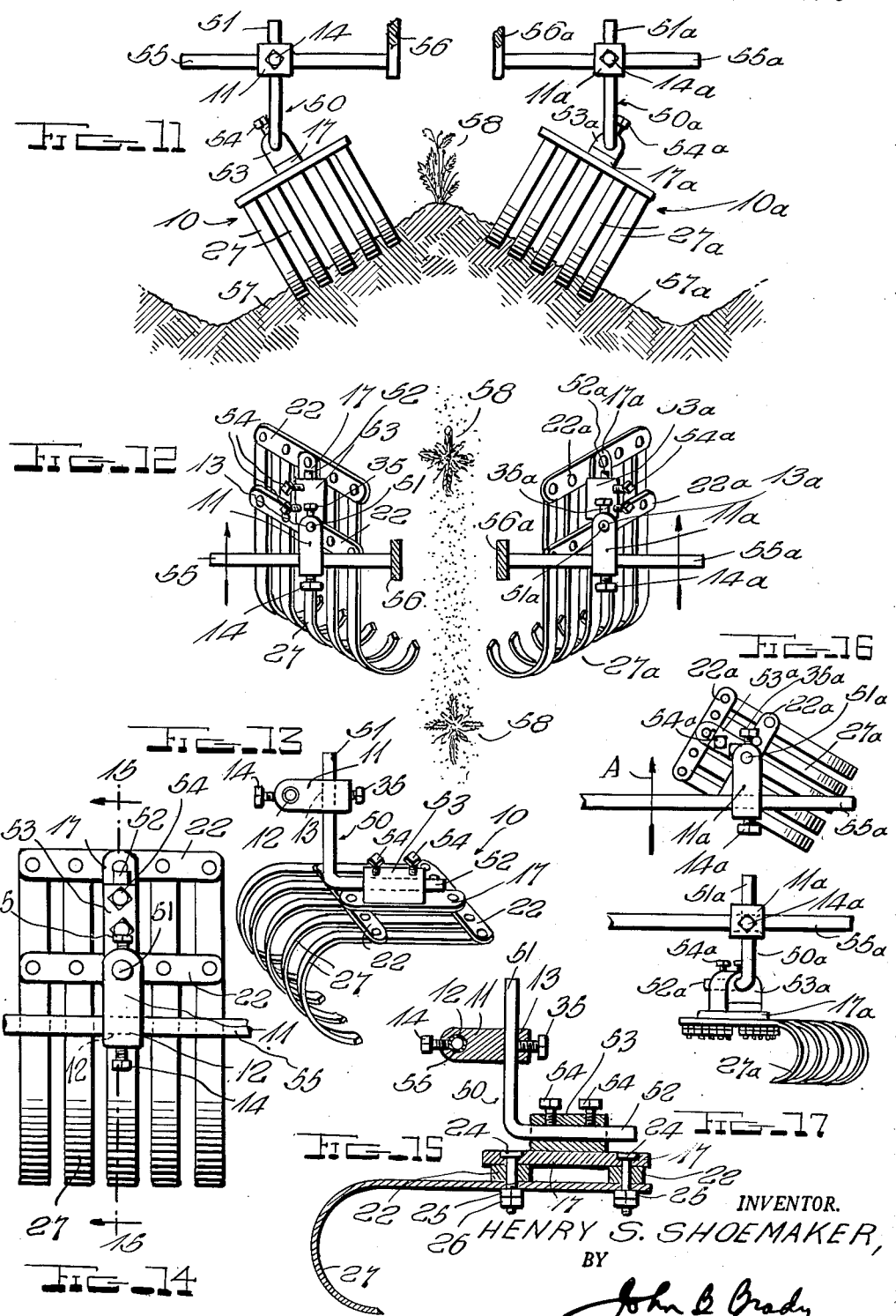

Patented Mar. 24, 1953

2,632,371

UNITED STATES PATENT OFFICE 2,632,371

CULTIVATOR

Henry S. Shoemaker, Rayville, La.

Application July 5, 1947, Serial No. 759,037

2 Claims. (Cl. 97—175)

1

My invention relates to farming tools and more particularly to harrows.

The hereinafter described subject matter is intended to constitute a continuation-in-part of my parent application filed July 16, 1945, and bearing the Serial No. 605,278, now abandoned.

An object of my invention is to provide a harrow farming tool with an adjustment feature whereby the width of the individual cuts made by the tine members of the harrow may be regulated.

Another object of my invention is to provide a harrow farming tool with an adjustment feature whereby the width of the combined pattern of the individual cuts made by the tine members of the harrow may be modified both as to the overall width of pattern and as to the spacing of the cuts made by the tines.

Another object of my invention is to provide a harrow farming tool with an adjustment feature whereby the depth of the cuts made by the tines may be regulated and the vertical angular position of contact of the tines of the harrow may be regulated.

Another object of my invention is to provide a harrow farming tool with an adjustment feature whereby the tines may be adjusted and regulated in various degrees radially in a horizontal plane or various degrees in a vertical plane or any combination of either.

Other objects and advantages of my invention will become apparent in the course of my detailed description to follow of the harrow implement embodying my invention illustrated in my drawings.

In the drawings Fig. 1 is a fractional plan view of a conventional tractor equipped with harrow implements embodying my invention;

Fig. 2 is a side elevational view of the harrow implement illustrating the vertical adjustment feature;

Fig. 2a is an enlarged fragmentary sectional view showing the manner of supporting the tines in the harrow implement;

Fig. 3 is an enlarged plan view showing the harrow implement in adjusted positions;

Fig. 4 is a plan view showing the harrow implement in a horizontally adjusted position with respect to a tractor carrying the same;

Fig. 5 is a vertical side elevational view of the harrow implement itself as seen from the outside of the same in the position illustrated in Fig. 4;

Fig. 6 is a vertical side elevational view of the harrow implement as seen from the outside of the same in the position illustrated in Figure 3 but in a revolved position with respect to the tractor carrying the same;

Fig. 7 is a partially broken side elevational view of my invention in modified form;

Fig. 8 is a front view thereof showing permissible vertical angular movements of the tine members;

Fig. 9 is a side elevational view showing a further adjustment of the tine members;

Fig. 10 is a side elevational view showing how the entire tine members may be adjusted to operate in the reversed position;

Fig. 11 is an end view of a multiple arrangement of harrows embodying my invention and operating in coacting relation with respect to a hilled crop row;

Fig. 12 is a plan view of the arrangement of harrows illustrated in Fig. 11;

Fig. 13 is a view showing one of the harrow implements of Figs. 7–12 in an angularly adjusted position;

Fig. 14 is a top plan view of one of the harrow implements shown in Figs. 7–13;

Fig. 15 is a vertical sectional view taken substantially on line 15—15 of Fig. 14;

Fig. 16 is a top plan view of one of the harrow implements of Figs. 7–15 oriented for operation with respect to one side of a hill forming a crop row, such as illustrated in Fig. 11; and Fig. 17 is an end view of one of the oriented harrow implements of Figs. 7–16, looking in the direction of arrow "A" of Fig. 16.

Referring to the drawings, letter T designates a conventional tractor which is provided with a forwardly positioned, transversely extended implement supporting beam F, the outer portion G of which is made cylindrical for reasons explained later. The tractor T is also provided with a rearwardly positioned implement supporting beam R, the outer portion S of which is also made cylindrical shaped.

The harrow implement designated generally by numeral 10 is adapted for attachment to a cylindrical portion G of the forward supporting beam F or to the cylindrical portion S of the rear supporting beam R by means of an adjustable connector 11.

The adjustable connector 11 is provided with a beam bore 12, made slightly larger in diameter than the diameter of the cylindrical portion G of the forward beam F and the cylindrical portion S of the rear beam R. The cylindrical portions G and S are preferably made the same as to diameters. The adjustable connector 11 is also provided with a shank bore 13 made slightly larger than the harrow supporting shank 15.

A set screw 14 is threadedly engaged in the adjustable connector 11 in a position to clamp the connector 11 to the outer portion G of the forward beam F or the outer portion S of the rear beam R, since the harrow implement is adapted for attachment to either the forward beam F or the rear beam R. In normal practice the tractor T will carry two forward beams F and two rear beams R, hence four implements 10 may be used at one time.

A second set screw 35 is threadedly engaged in the connector 11, in position to clamp the round harrow supporting shank 15 to the connector 11 in any vertically adjusted position in the connector 11 (see Fig. 2) and rotated positions (see Fig. 4) in the connector 11, from its normal horizontal position as seen in Fig. 1.

Before discussing the various figures of my drawing illustrating some of the many adjustments that may be made in the setting of my harrow implement 10 as a whole, I will finish my description of the harrow implement 10 itself.

The connector 11 above described is an important part of my invention, because it will be understood in the course of my description of my harrow implement 10 that adjustments in the various other members of the same may be made which will change its action such as the overall width of its pattern of cut on the earth's surface it contacts.

The shank 15 above mentioned, is provided with an internally threaded lower end 16 which is superimposed over a hole 17b in the heel end of a foot bar 17 to which it is welded in a perpendicular position.

The foot bar 17 is pivotally connected to one of a pair of parallel flat bars 22 by means of a pivot bolt 19 screwed into the internally threaded end 16 of the shank 15 extending through the rear parallel bar 22. The toe end of the foot bar 17 is pivotally connected to the forward parallel bar 22 by means of a toe end pivot bolt 24 secured by nut 25, and a lock nut 26.

Both the shank pivot bolt 19 and the toe end pivot bolt 24 are extended through aligned holes in the shaped tines 27.

I have illustrated in my drawings a harrow implement 10 provided with five C shaped tines 27, but it is to be understood that a greater or lesser number of tines 27 may be used if desired within the scope of my invention.

A harrow made according to the teachings of my invention with only a single middle tine 27 is provided with pairs of spaced holes through means of which it is pivotally connected to the pair of flat parallel bars 22 which are also provided with holes to match the pivot holes in the tines 27 for alignment in their assembly.

The tines 27, except the center one, are assembled to the flat parallel bars 22 by means of pivot bolts 24, nuts 25 and lock nuts 26 (Figs. 5 and 6). The tines 27 are positioned on the underside of the parallel bar 22 in parallel relationship. Since the pairs of pivot holes in the tines 27 are all equally spaced the tines 27 stay parallel to one another for all adjustments of the parallel bar 22 such as the adjusting positions of these shown by the long and short dash line adjusted positions in Fig. 3 of the drawings.

A spacing bar 30 is pivotally mounted at one of its ends, preferably as shown in the drawings, to one of the end pivot bolts 24 on the forward parallel bar. This spacing bar 30 is provided with a series of spaced holes 31 of a size large enough to fit around any of the pivot bolts 24 extended through the parallel bars 22.

In the position shown in Fig. 1 and the solid line position of Fig. 3, the tines 27 are spaced apart their maximum distances. To bring the tines 27 close together the parallel bars 22 are moved toward one another. When the rear parallel bar 22 is moved in a left direction with respect to the forward parallel bar, as seen in Fig. 1 and Fig. 3, the inside tine 27, the one nearest the tractor T is placed in the lead. When the parallel bar 22 is moved to the right the outside tine 27 is put in the lead. The reader must keep in mind that in this adjustment the shank 15 and the foot bar 17 joined to it are held stationary.

To make these adjustments a nut 25 and lock nut 26 on the proper pivot bolt 24, in the rear parallel bar 22, must be removed and replaced. Where the spacer bar 30 is secured in place the parallel bars 22 are held in fixed parallel positions and all five tines 27 are held in fixed parallel positions. To better understand other adjustments of my harrow implement 10 to be explained later, the reader should keep in mind that the teeth 29 of the tines 27 are maintained in straight line alignment throughout all adjusted positions of the tines 27.

In Fig. 2, I illustrate a simple practical adjustment of my harrow implement 10 with respect to the earth's surface. To make this adjustment the set screw 35 in contact with the shank 15 is loosened, and the shank is moved up through the connector 11 to the desired position and secured again by means of the set screw 35. This adjustment may be made regardless of any angular adjusted position of the tine assembly such as the positions as shown in Fig. 1 where the tines 27 are in open position or the contracted position of the tine 27 as shown in Fig. 3 and Fig. 4 of the drawing.

The harrow implement 10 including the connector 11 may be adjusted in any desired revolved position about the cylindrical portion G of the forward beam F or the cylindrical portion S of the rear beam R. If desired my harrow implement 10 may be set in tandem formation with a leading harrow implement 10 adjusted differently from the following harrow implement 10. Where the tandem formation of arrangement of my harrow implement 10 is taken into consideration the reader will appreciate many other modes of operation of the same in addition to harrowing may be carried out.

The continuation-in-part of my parent application is illustrated by Figs. 7-17 of the drawing. Numeral 50 designates a bent shank or member 50 substantially in the form of an L, one leg 51 of which is extended upwardly through the shank bore 13 of the adjustable connector 11. The opposite leg 52 of L-shaped shank 50 is bent at right angles and extends forwardly of the supporting beam to which it is connected.

The forward leg 52 of the shank member 50 is slidably embraced by a sleeve 53 which may be releasably locked at any desired position along the forward leg 52 by a pair of set screws 54 threadedly positioned through a side wall of the sleeve 53; these adjustments being more clearly illustrated by Fig. 9.

In this instance the sleeve 53 is welded or otherwise attached to the foot bar 17, which is pivotally connected to the flat bars 22 and finally to the tines 27 themselves as formerly described. The sleeve 53 extends linearly of the foot bar 17 for a distance substantially equal to the distance between the adjacent edges of the flat bars 22 permitting access to the bolts 24 at each end thereof for rapid replacement of the tine 27 that is secured by the bolts 24 and lock nuts 25 and 26.

On certain occasions it is highly advantageous that the entire implement be reversed from its normal position on the tractor. For instance in a sharp corner of a field or the like, or endeavoring to cultivate what is known to farmers as a "fence row," or in narrow "lanes" between crops or trees which prohibit turning the tractor around. In any such case the set screw 35 may be loosened and the entire mechanism 10 reversed simply by turning the shank 50, 180 degrees. The set screw 35 may then be tightened and the mechanism used in reverse as represented at 10' in Fig. 10 without affecting its adjustment as to angularity, depth or any other lazy-tong setting of the flat bars 22.

It will be noted from Fig. 8 of the drawing that my implement may be set to any side angular adjustment or may be set to combine with other vertical and side angular adjustments through the simple setting of the sleeve 53 and the adjustable connector 11. Thus where a tractor is used to plow or weed growing crops, the tines 27 may be set to the exact inclination of the row bed instead of having to turn the soil either against or away from the "hills."

I have shown in Figs. 11 and 12 the application of the harrow implements of my invention as heretofore explained in connection with Figs. 7–10 to the opposite sides of a hill constituting a crop row. The tractor or vehicle chassis which carries the harrow implements is provided with oppositely extending supporting beams having outer cylindrical portions which I have designated at 55 and 55a connected to supports 56 and 56a, respectively, which supports depend from the tractor or vehicle chassis. The adjustable connectors 11 and 11a are swivelly secured on the cylindrical portions 55 and 55a of the projecting beams and may be selectively set at the desired angle thereon by tightening the set screws 14 and 14a. Thus the connectors 11 and 11a are set in a predetermined angular position within a range of certain horizontally extending planes. The adjustable connectors 11 and 11a are each apertured in a substantially vertical direction to receive through bores 13 and 13a the upwardly extending legs 51 and 51a of the L-shaped shanks or members 50 and 50a. The upwardly extending legs 51 and 51a of L-shaped shanks or members 50 and 50a are selectively adjustable with respect to the adjustable connectors 11 and 11a and may be secured in selected position by set screws 35 and 35a, respectively, for correspondingly raising or lowering the harrow implements 10 and 10a.

The harrow implements 10 and 10a are constructed as described in connection with Figs. 7–10 including the sets of tines 27 and 27a depending from the sleeves 53 and 53a. The sleeves 53 and 53a each have horizontally extending bores therein through which the legs 52 and 52a of the shank or members 50 extend. Because of the fact that the bores through sleeves 53 and 53a are cylindrical and the legs 52 and 52a of the shanks or members 50 and 50a each have the corresponding section, the harrow implements 10 and 10a swivel about the legs 52 and 52a and the harrow implements may be adjusted forwardly and rearwardly with respect to the legs 52 and 52a and then set in position by tightening set screw 54. This enables the harrow implements to effectively operate on opposite sides of the hill of a crop row as represented in Fig. 11, where harrow implement 10 cultivates the side 57 of the hill of the crop row, while harrow implement 10a cultivates the side 57a of the hill of the crop row on opposite sides of the growing crop as represented for example at 58.

In Fig. 12 I have shown in plan view the harrow implements illustrated in end view in Fig. 11 and shown in the manner in which the ends of the tines 27 and 27a may be adjusted for effectively cultivating the opposite sides of the hills of the crop row.

Fig. 13 illustrates one of the angularly adjusted positions of the harrow implement shown in Figs. 7–12. This view brings out clearly the fact that the L-shaped shank or member 50 may be adjusted vertically in the connector 11; the connector 11 moved angularly through a horizontal plane about bore 12; the upwardly extending leg 51 revolved in connector 11; and the sleeve 53 attached to harrow implement 10 adjusted angularly about the forward leg 52 of the shank or member 50 to rock the plane of the tines 27 through various horizontal planes; and the tines 27 advanced or retracted by sliding sleeve 53 along the horizontally extending leg 52 of the L-shaped shank or member 50. Thus a very wide adjustment of the effective position of the tines may be effected.

In Figs. 14 and 15 I have illustrated in detail the structure of the harrow implement in plan view and in longitudinal section. These views again bring out the wide variety of adjustments of which the tines 27 are capable by reason of the mounting thereof through L-shaped shank or member 50.

In Figs. 16 and 17 I have shown one of the many possible positions of the tines 27a wherein the angular position of the tines about the axis of the upwardly extending leg 51a is so selected that the several spaced tines 27a are effective over a narrow band of earth than are the tines when maintained in the position illustrated in Figs. 11 and 12.

By applying the principles illustrated in the adjustable harrow implements of Figs. 1–6 the individual spacing between the tines 27 may be controlled and by moving the harrow implements as represented in Figs. 16 and 17 to the desired angular position the band over which the entire harrow implement is effective may be controlled.

Sufficient explanation of my invention has now been given to enable anyone skilled in farming operations to adjust the cultivator to perform according to his particular needs.

Since the manufacture of my harrow 10 will not present any problems to manufacturers manufacturing similar lines of equipment there is no need of going into the details of manufacturing operations relating to its manufacture. It is suggested, however, that the tines 27 should be made out of flexible steel because in the use of this farming implment roots in the ground may be encountered which would cause brittle tines to break before they could release themselves.

I claim:

1. A harrow unit comprising a pair of spaced horizontally extending flat bars, a multiplicity of harrow tines spaced one from another and extending in substantially parallel planes and pivotally and replaceably connected at spaced positions along said flat bars by attaching bolt and nut members, a centrally disposed foot bar pivotally connected with central positions along said first mentioned bars, a block member supported by said foot bar and projecting upwardly therefrom for a linear distance intermediate the positions of said attaching bolt and nut members that replaceably secure said harrow tines to a position above the plane of all of said bars, said block member having a bore extending longitudinally thereof on an axis coincident with the central axis of said harrow unit with the tines thereof symmetrically arranged on either side of the central axis thereof, set screws carried by said block and adjustable into and out of the bore in said block whereby a supporting rod extending through the bore in said block may be gripped in said block in any selected angular position.

2. An adjustable harrow unit consisting of a frame formed by a pair of flat spaced coplanar bars, a plurality of spaced harrow tines, attachable and detachable bolt and nut securing means for replaceably and adjustably fastening said harrow tines in spaced relation along said bars, a foot bar extending coplanar with a central one of said harrow tines with the others of said plurality of tines arranged symmetrically on opposite sides of said central tine, said foot bar being adjustably fastened with said pair of flat spaced coplanar bars by the same bolt and nut attachable and detachable securing means that fasten the central one of said harrow tines with said pair of flat spaced coplanar bars, a sleeve carried by the top of said foot bar and extending coplanar therewith and terminating short of the bolt and nut attachable and detachable securing means that fasten the central one of said harrow tines and said foot bar with said pair of flat spaced coplanar bars for providing unobstructed access to said last mentioned bolt and nut attachable and detachable securing means, said sleeve having a cylindrical bore extending axially therethrough in a plane coincident with the plane of the central longitudinal axis of said frame, a supporting rod of circular section having a vertically depending portion and a horizontally extending portion, and means carried by said sleeve for adjustably gripping the horizontally extending portion of said supporting rod.

HENRY S. SHOEMAKER.

REFERENCES CITED

The following references are of record in the file of this patent:

UNITED STATES PATENTS

| Number | Name | Date |
|---|---|---|
| 456,318 | Stevens et al. | July 21, 1891 |
| 902,279 | Diesem | Oct. 27, 1908 |
| 983,450 | Kelly | Feb. 7, 1911 |
| 1,122,637 | Young | Dec. 29, 1914 |
| 1,244,982 | Horst | Oct. 30, 1917 |
| 1,690,525 | Best et al. | Nov. 6, 1928 |
| 1,746,606 | Ray | Feb. 11, 1930 |
| 1,946,664 | Benjamin | Feb. 13, 1934 |
| 2,239,387 | Johnson | Apr. 22, 1941 |
| 2,413,467 | Patterson | Dec. 31, 1946 |